(12) United States Patent
Booth

(10) Patent No.: US 7,828,657 B2
(45) Date of Patent: Nov. 9, 2010

(54) SYSTEM AND METHOD FOR ENHANCING THE EXPERIENCE OF PARTICIPANT IN A MASSIVELY MULTIPLAYER GAME

(75) Inventor: Jason Booth, Dedham, MA (US)

(73) Assignee: Turbine, Inc., Westwood, MA (US)

( * ) Notice: Subject to any disclaimer, the term of this patent is extended or adjusted under 35 U.S.C. 154(b) by 822 days.

(21) Appl. No.: 10/441,958

(22) Filed: May 20, 2003

(65) Prior Publication Data

US 2004/0235564 A1 Nov. 25, 2004

(51) Int. Cl.
*A63F 13/00* (2006.01)

(52) U.S. Cl. ............................ 463/35; 463/1; 463/30; 463/42

(58) Field of Classification Search .................. 463/31, 463/35, 40–42, 1, 6, 33, 30
See application file for complete search history.

(56) References Cited

U.S. PATENT DOCUMENTS

| | | | | |
|---|---|---|---|---|
| 5,576,946 | A | 11/1996 | Bender et al. | 364/146 |
| 6,053,951 | A | 4/2000 | McDonald et al. | 717/1 |
| 6,106,399 | A * | 8/2000 | Baker et al. | 463/42 |
| 6,334,158 | B1 | 12/2001 | Jennyc et al. | 709/328 |
| 6,449,715 | B1 | 9/2002 | Krivoshein | 713/1 |
| 6,482,087 | B1 | 11/2002 | Egozy et al. | 463/7 |
| 6,705,945 | B2 * | 3/2004 | Gavin et al. | 463/31 |
| 6,878,869 | B2 * | 4/2005 | Mita et al. | 84/609 |
| 2001/0007824 | A1 * | 7/2001 | Fukuda | 463/7 |
| 2002/0002414 | A1 | 1/2002 | Hsiung et al. | 700/95 |
| 2002/0029097 | A1 | 3/2002 | Pionzio, Jr. et al. | 700/286 |
| 2002/0061743 | A1 | 5/2002 | Hutcheson et al. | 455/426 |
| 2002/0094865 | A1 * | 7/2002 | Araki et al. | 463/35 |
| 2002/0094866 | A1 * | 7/2002 | Takeda et al. | 463/35 |
| 2002/0147808 | A1 | 10/2002 | Osburn, III | 709/224 |
| 2002/0191023 | A1 | 12/2002 | Chandhoke et al. | 345/771 |
| 2003/0008712 | A1 | 1/2003 | Poulin | 463/42 |
| 2003/0009754 | A1 | 1/2003 | Rowley et al. | 717/177 |
| 2003/0035010 | A1 | 2/2003 | Kodosky et al. | 345/771 |
| 2003/0037149 | A1 | 2/2003 | Hess | 709/227 |
| 2003/0087221 | A1 | 5/2003 | Sagar | 434/319 |

OTHER PUBLICATIONS

Hays, Tom "DirectMusic for the Masses" Nov. 6, 1998. www.gamasutra.com.*
Harland, Kurt,"Composing for Interactive Music" Feb. 17, 2000. www.gamastra.com.*
Ultima Online: Renaissance, Game Manual released Apr. 30, 2000.*
Asheron's Call 2: Fallen Kings First Impressions by Staci Krause, Posted online Nov. 27, 2002 retreived from http://pc.ign.com/articles/378/378885p1.html.*
Editorial Preview by The Adrenaline Vault, "Spec Ops 2: Green Berets," http://www.avault.com/previews/preview_temp.asp?game=specops2&page=2 (3 pgs.) 2003.

(Continued)

*Primary Examiner*—Ronald Laneau
*Assistant Examiner*—Ross A. Williams
(74) *Attorney, Agent, or Firm*—Occhiuti Rohlicek & Tsao LLP

(57) ABSTRACT

Methods and systems are provided for transforming music played by characters, objects and non-player characters in order to produce an enhanced audio experience for players within a massively multiplayer game.

40 Claims, 4 Drawing Sheets

OTHER PUBLICATIONS

Walsh, Ciaran, "Prisoner of War," http://www.music4games.net/f_powiv.html (3 pgs.).

Lynne, Bjorn, "Games That Use DirectMusic," http://www.freelists.org/archives/directmusic/07-2002/msg00008.html (2 pgs.) 2002.

Microsoft Corporation, "DirectMusic Producer Version 7.0: New Features for Creating Interactive Audio Content" http://msdn.microsoft.com/library/default.asp?url=library/en-us/dnmusic/html/dmp_7.asp (7 pgs.) 2000.

* cited by examiner

SYSTEM AND METHOD FOR ENHANCING THE EXPERIENCE OF PARTICIPANT IN A MASSIVELY MULTIPLAYER GAME

FIELD OF THE INVENTION

This invention relates generally to multiplayer computer games, and in particular, to methods for improving the experience of a participant in a massively multiplayer game.

BACKGROUND OF THE INVENTION

A massively multiplayer game ("MMP") is a computer game played by a large number of users through a communications network, which can be a local area network (e.g., Ethernet), a medium-area network (e.g., an intranet), or a wide-area network (e.g., the Internet). In addition, the communications network can be a wireless network, a cellular network or any other system which facilitates the transmission of data. In MMPs, humans and their avatars within the game ("players") are free to interact with other players as well as autonomous "non-player characters" which inhabit and are part of the game. Early examples of MMPs include games such as Ultima Online, EverQuest, and CrossGate.

Most MMPs are fantasy role-playing games ("RPGs") which take place within a mythical or mystical world. Most MMPs appear timeless, in that from the player's perspective they have no beginning and no end. New players can join a game in progress at any time, and do not need to wait for the start of a new game. In addition, many MMPs do not even define an absolute game endpoint, making the end of a game a logical impossibility. Thus, once a game has started, it can continue indefinitely. The players of that MMP are thereby involved in a continuing storyline akin to life within the real world. MMPs allow players to develop their avatars, form personal relationships with other players, and to enjoy social interaction through the reality of the game.

In order to make MMPs more immersive for their players, MMP creators constantly strive to provide a richer and more complete sensory interaction. While much attention has been devoted to improving the content, graphic depiction and haptic interfaces between MMPs and their players, there has been less attention devoted to the audio components of MMPs. However, developers are always seeking new methods and systems to improve the soundtracks and musical content of their games. Accordingly, new systems methods are needed to improve players' audio experiences of MMPs.

SUMMARY OF THE INVENTION

In satisfaction of this need, embodiments of the present invention provide methods and systems for enriching the audio characteristics of MMPs.

In accordance with one aspect of the invention, a method is provided for enhancing the experience of a player participating in a computer game. This method comprises determining a player's contextual location, selecting a groove level based upon the context, playing a background theme based upon the player's location and groove level and enabling the first player to play a melody. This melody can then be synchronized either with the background theme or with the melodies of other players, non-player characters or other objects. In addition, methods are provided which allow for expansion of the audio experience of all players within the game.

In accordance with another aspect of the invention, a system is provided for enhancing the experience of a player participating in a computer game. Specifically, the system includes a context module, a groove module, a background theme database and a sound output module. The context module receives location coordinates of a player within the virtual world and determines a context for the first player based upon these coordinates. The groove module selects a groove level based upon the number of players and non-player characters present in the first player's context. The background theme database stores a plurality of background themes. A sound output module selects one of the plurality of background themes based upon the first player's context and the groove level. Finally, a user is able to play a melody in harmony with the background theme.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE PREFERRED EMBODIMENTS

The methods and systems to enhance the audio experience of a player participating in a MMP will now be described with respect to preferred embodiments; however, the methods and systems of the present invention are not limited to massively multiplayer games. Rather, the methods and systems can be used in any computer game or environment in which it is useful or enjoyable to provide context specific audio. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention.

System Architecture

While the content and nature of MMPs is the key to their widespread success, it is important to understand the technological underpinnings of a typical MMP. While it is possible to host and play a computer game, and even an MMP, on a single computer, it is not preferred for MMPs. Accordingly, the following description of an exemplary system architecture is provided.

Figure 1:
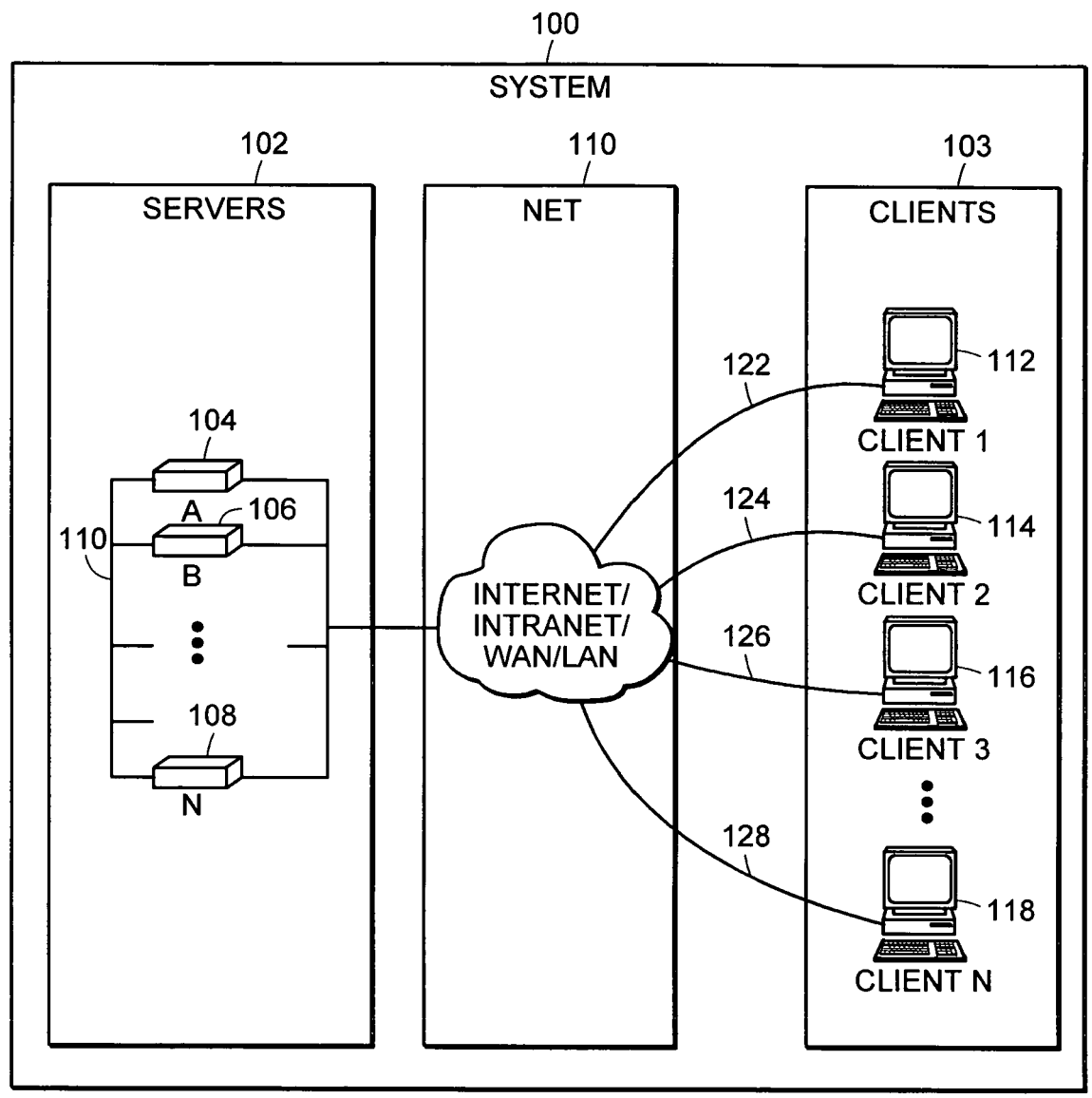
FIG. 1 illustrates a distributed computer system in accordance with one embodiment of the present invention.

FIG. 1 illustrates a distributed computer system 100 in accordance with one embodiment of the present invention.

The system 100 includes a server platform 102 and a client or player platform 103. The server platform 102 can include a plurality of individual servers 104, 106, 108. The client platform 103 can include a plurality of individual clients 112, 114, 116, 118. The number of clients is virtually limitless, constrained only by the physical characteristics of the server platform 102, client platform 103 and a communications network 110 connecting the two. As will be appreciated, the system 100 is a distributed virtual environment tailored to facilitate MMPs.

Each of the clients 112, 114, 116, 118 preferably comprises a personal computer running client software which facilitates a player's operation of and interaction with the game. However, in other embodiments the clients 112, 114, 116, 118 may also comprise other devices, including but not limited to, cellular telephones (such as the Motorola Inc. A388c), wireless or palmtop computers (such as the Series 7 by Psion PLC), portable digital assistants (such as the Tungsten C by Palm Inc.), handheld game systems (such as the Gameboy Advance by Nintendo of America Inc.), game consoles (such as the Play Station 2 by Sony Corporation of America), etc.

Each client 112, 114, 116, 118 is generally responsible for displaying interacting objects (other players, terrain, non-player characters, etc.), displaying the game's interface, processing a player's inputs, playing music and sound and performing other CPU or bandwidth intensive operations.

Each of the servers 104, 106, 108 generally includes a computer system having a server platform portion of the game for communication, database storage, coordination, and overall control and administration of the game. The servers 104, 106, 108 generally maintain state information and coordinate client interaction with various objects in a virtual environment, including but not limited to other clients, vehicles, artificial intelligence, terrain, music and sound. Each server 104, 106, 108 provides additional functions, such as security, recording game goals and scoring and tracking each player's advancement towards those goals.

The clients 112, 114, 116, 118 communicate with the server platform 102 via the communication network 110. In the preferred embodiment, the communication network 110 depicted comprises the internet, but in other embodiments the communication network 110 could be an intranet, WAN or LAN, or any other type of network utilized for communicating between the server platform 102 and the client platform 103. For example, the communications network 110 could include, without limitation, a wireless network, a cellular network or any other system which facilitates the transmission of data. Each client 112, 114, 116, 118 has an associated communications link (or session) with one or more of the servers 104, 106, 108. As shown in FIG. 1, client 1 112 could communicate with server A 104 via a communications link 122. Similarly, client 2 114 could communicate with server B 106 via communications link 124. The servers 104, 106, 108 are preferably interconnected via a communications network 110. In the embodiment shown in FIG. 1, the communications network 110 is depicted as a dedicated network, but could also be a shared network such as the Internet.

During operation of the system 100, a particular client, for example client 1 112, which desires to enter the game communicates through a communications link 122 with an allocated server A 104. The determination of which specific server 104, 106, 108 a particular client is linked with will depend on a number of parameters, such as server load, number of clients, location of clients, status of client (e.g., position) within the game itself, and other parameters as are known to those skilled in the art. In the particular embodiment shown in FIG. 1, the number of servers 104, 106, 108 needed for allocation depends upon the number of clients. FIG. 1 illustrates operation of the system 100 when a large number of clients 112, 114, 116, 118 are logged onto a plurality of servers 104, 106, 108.

When there are relatively few clients 103 participating in the game, only one server is typically needed to serve the clients 103. During game operation, there is often no need for direct communication between clients. The server platform 102 communicates with each client its positional, status and event data (referred to as client or player data, or as a player's attributes) for every other player and object the client can see or interact with inside the virtual environment of the game. Such player data includes, but is not limited to, avatar attributes, type, physics modeling, scoring, position, orientation, motion vector, animation, background music, player music, inventory, vehicle, call sign, or other client or object attributes necessary for the particular game. Typically, the server includes a database of information that is maintained and updated as the players interact within the game. Through the interaction between the client platform 103 and the server platform 102, the game is facilitated.

Virtual Environment of the Game

Figure 2:
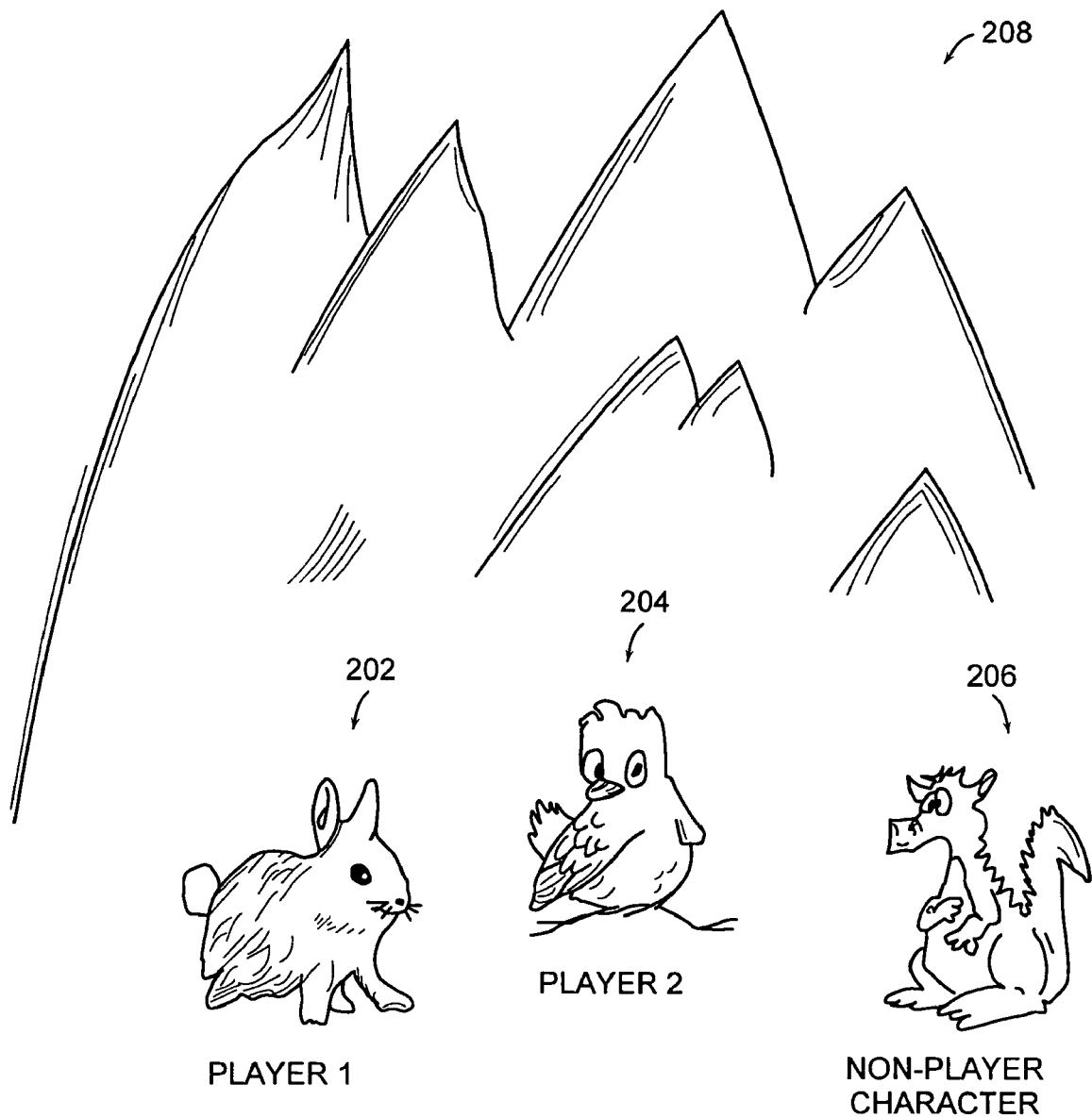
FIG. 2 depicts a typical scene within the virtual environment of the game.

FIG. 2 depicts a typical scene within the virtual environment of one embodiment of an MMP. As illustrated in FIG. 2, a number of objects are present within the scene. As described previously, each player is free to represent himself or herself in the virtual environment of the game through the use of an avatar. In the embodiment shown in FIG. 2, player 1 has chosen a small rabbit 202 (the "bunny") as his avatar. Player 2 has chosen a young bird 204 (the "chick") as his avatar. In the virtual environment of the game, each player sees his or her own avatars on the screen, and can interact with other players, non-player characters and objects through the avatars.

As shown in FIG. 2, the bunny 202 and the chick 204 are located with a mountain range context 208. This context 208 defines many parameters of the game. Within the preferred embodiment of the claimed invention, these parameters can include characteristics such as temperature, ambient noises, musical selection, groove level, number and type of non-player characters, etc. For example, the temperature of the mountain range context might be lower than comfortable for the bunny 202 and the chick 204. In order to continue playing, Player 1 and Player 2 can need to direct the bunny 202 and the chick 204, respectively, to a warmer region such as a campfire (not illustrated). Alternately, the respective players can navigate the bunny 202 and the chick 204 to an area where they can obtain warm clothing (not illustrated). Should they find such an area, the bunny 202 and the chick 204 can either wear the warm clothing or add it to their personal storage spaces, or "inventories" for later use. In addition to storing clothing, a character's inventory can be used to store items and objects of various types, including weapons, armor and musical instruments.

Non-player characters can also be present within the context of the mountain range 208. For example, a non-player dragon character 206 (the "dragon") can reside within the mountain range 208. The dragon 206 is not controllable by any player. Instead, the dragon 206 exists and interacts with other players, non-player characters, objects and contexts through the preprogrammed game logic. For example, the dragon 206 can seek to consume the chick 204 and the bunny 202, should they venture within his portion of the mountain range 208.

The "groove level" of a particular context is a variable affiliated with the amount of excitement or tension level of that specific context. The groove level increases as excitement or tension increases, and decreases as excitement or tension abates from a specific context. Each context is assigned a default groove level. As the game progresses, a variety of factors can affect the groove level for a given context, including, without limitation, the number of players in the context, the number of non-player characters in the context, objects in a context, and the interaction between players, non-player characters and objects in the context.

As an example, consider the groove level of the mountain range 208. Preferably, the mountain range 208 has a default groove level γ. When the bunny 202 is alone within the mountain range 208, the groove level remains at the default setting, γ, because there is not much tension in the context. Assuming that they bear no hostility towards each other, when the chick 204 joins the bunny 202 in the mountain range 208, the groove level can be decreased by a predetermined amount, e.g., γ−1. However, when the bunny and dragon 206 appears in the mountain range 208, the tension can be increased. Accordingly, the groove level can be increased by a predetermined amount, e.g., γ+1. Should a second dragon (not illustrated) or other non-player character enter the mountain range 208, the groove level would be again modified by the predetermined amount. In this fashion, the number and type of objects, players, and non-player characters within a given context modifies the groove level of that particular context. One skilled in the art would recognize that alternate modifications of the groove level are equivalent to the illustrate example, including, without limitation, altering the groove level through multiplication and division, alphabetical shifting, integration and derivation, or even through a complex polynomial equation.

Audio Environment of the Game

In addition to providing the virtual environment and groove level described above, a context also preferably provides an enjoyable audio environment. Preferably, any time that the bunny 202 and the chick 204 are within the mountain range 208, Player 1 and Player 2 will hear sounds and music associated with that particular context. For example, each player can hear one or more of the following:

Context-only sounds: these are sounds which can only be heard by players in the same context.

Loud sounds: these are sounds which can be heard by players in the context containing the sound, and all adjacent contexts to that context.

Environmental sounds: sounds used to produce ambiance within a context or a group of contexts. These are sounds generally not associated with a specific position within a context (e.g. the wind, crickets chirping at night).

Looping sounds: sounds that play continuously.

Intermittent sounds: these are sounds that continually repeat, with a delay between each repetition. The delay can be random number generated from a specified range. This is used for repetitive sounds that occur occasionally, such as a bird chirping or a dog barking.

Background themes: music which corresponds to the specific context in which the player's avatars are present. Background themes can include components comprising baseline chord progressions, percussion, melodies, harmonies, and any other musical element.

Figure 3:
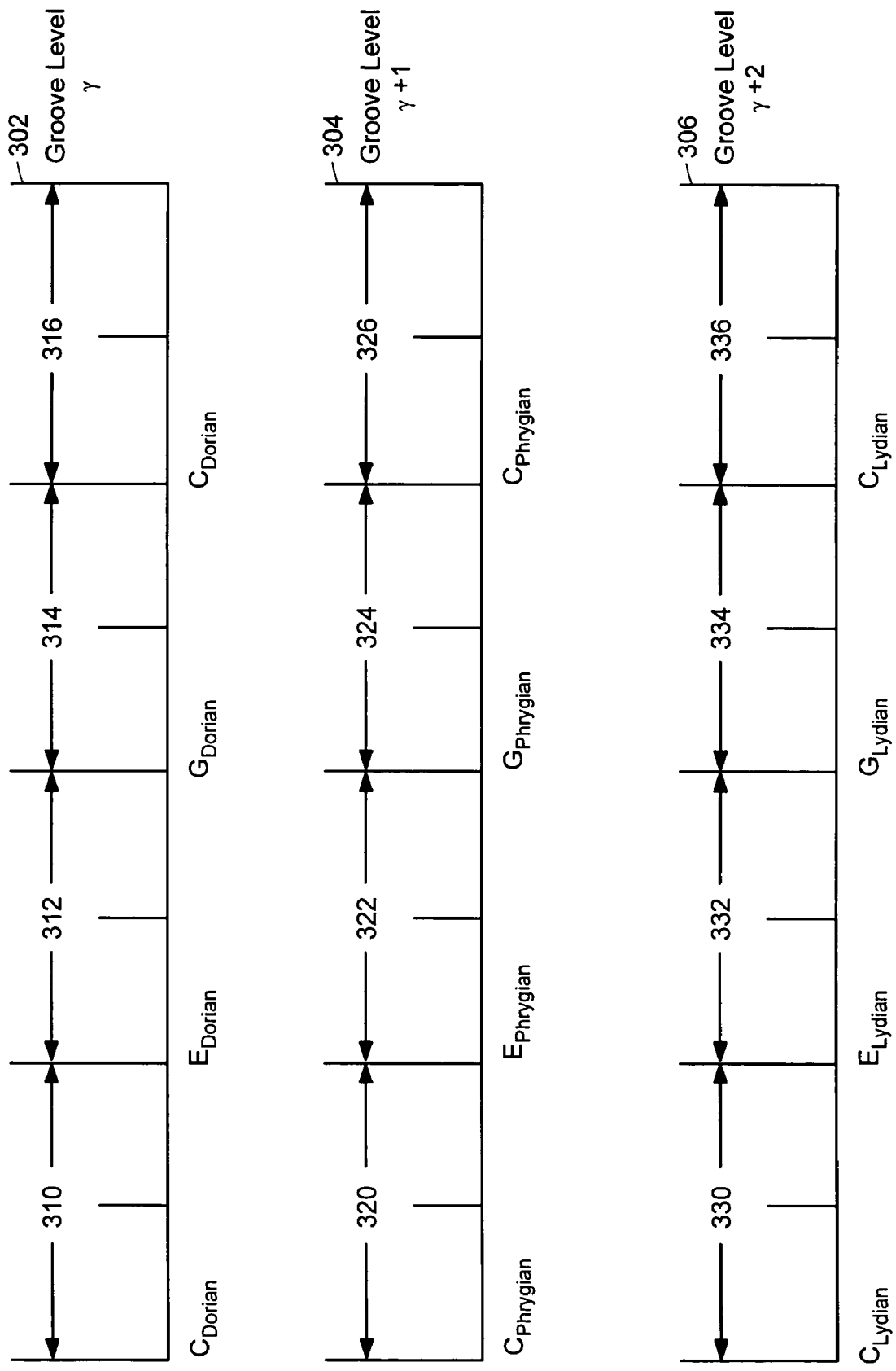
FIG. 3 illustrates the chord progression component of a background theme associated with a specific context.

FIG. 3 illustrates the chord progression component of a background theme associated with a specific context. In the preferred embodiment, the background theme is selected by the game's logic based upon (1) the context and (2) the groove level. In FIG. 3, three 4-bar themes are shown. A first theme 302 represents a first chord progression for the background theme at a groove level of γ. A second theme 304 represents a second chord progression for the background theme at a higher groove level. A third theme 306 represents a third chord progression for the background theme at a still higher groove level. The musical mode of the background theme can be selected from modes including, but not limited to, Ionian, Dorian, Phrygian, Lydian, Mixolydian, Aolian or Locrian. In addition, the selected mode can include chord progressions from major or minor triads including, but not limited to, those separated by either whole steps or half steps. In the case of the latter, the mode can be referred to as a "Half-Tone" mode. As should be evident to one skilled in the art, each of the chord progressions is a repeating sequence, and forms only one part of the total background theme for a given context.

Operation of the Preferred Embodiment

The operation of the preferred embodiment of the present invention is hereby described with reference to FIGS. 1-4.

In the preferred embodiment, the first theme 302 for the mountain range 208 contains a repeating chord progression based upon a groove level γ, comprising one bar each of the chords $C_{Dorian}$ 310, $E_{Dorian}$ 312, $G_{Dorian}$ 314, and returning to $C_{Dorian}$ 316. While a character, for example, the bunny 202, is present in the mountain range 208, this chord progression will loop indefinitely as an integral part of the background theme.

Upon the occurrence of an external event, the groove level is changed. In one embodiment, when the dragon 206 appears in the mountain range 208, the groove level of the mountain range context 208 is increased to represent the increased tension that the bunny 202 must feel. Accordingly, at the end of the current iteration of the first theme 302 the background theme changes its chord progression to that of the second theme 304. The second theme 304 contains a repeating chord progression based upon an increased groove level, comprising one bar each of the chords $C_{Phrygian}$ 320, $E_{Phrygian}$ 322, $G_{Phrygian}$ 324, and returning to $C_{Phrygian}$ 326.

Similarly, upon the occurrence of another external event, the groove level is again changed. When a second dragon (not shown) appears in the mountain range 208, the groove level of the mountain range context 208 is increased to a still higher level to represent the additionally heightened tension that the bunny 202 must feel. Accordingly, at the end of the current iteration of the second theme 304 the background theme changes its chord progression again to that of the third theme 306. The third theme 306 contains a repeating chord progression based upon the still higher groove level, comprising one bar each of the chords $C_{Half\text{-}Tone}$ 330, $E_{Half\text{-}Tone}$ 332, $G_{Half\text{-}Tone}$ 334, and returning to $C_{Half\text{-}Tone}$ 336.

Thus, in accordance with the preferred embodiment of the present invention, the chord progression underlying the background theme is transposed from a Dorian progression to a Half-Tone progression. Similarly, should the dragons be dispatched, or should a similarly tension-reducing event occur (e.g., the chick 204 entering the mountain range 208), the groove level would revert to a lower level and the background theme would once again make use of the Dorian chord progression.

In addition to the context-sensitive background music, the preferred embodiment of the present invention allows players and non-player characters to play context-sensitive musical accompaniment to the background melody. Specifically, each player's character can play music in one of two ways. First, if a player's character has a musical instrument within its inventory, the character can use the instrument to play a melody of the player's choice, in order to put on a "performance". Second, if a player's character does not have an instrument, that character can make percussion sounds with its body, or "beat-box."

Although in the absence of a background melody, a player will hear his or her character's music as a solo performance, the preferred embodiment of the present invention provides a method and system for synchronizing and harmonizing a character's musical performance with both the background music and the musical performances of other players' characters, non-player characters and objects within a given context. Preferably, if a character is musically performing while in a context wherein there is background music, the game will change that character's music such that (1) the character's melody is transformed to harmonize with the background music's key, mode and pitch, and (2) the tempo of the character's melody will be increased or decreased to match that of the background music. In addition, the character's music will similarly be transformed to harmonize with any other performances currently occurring in the same context. Melody transposition and tempo matching can be performed by making calls to the DirectMusic Application Programming Interface, manufactured by Microsoft Corp. of Redmond, Wash.

Figure 4:
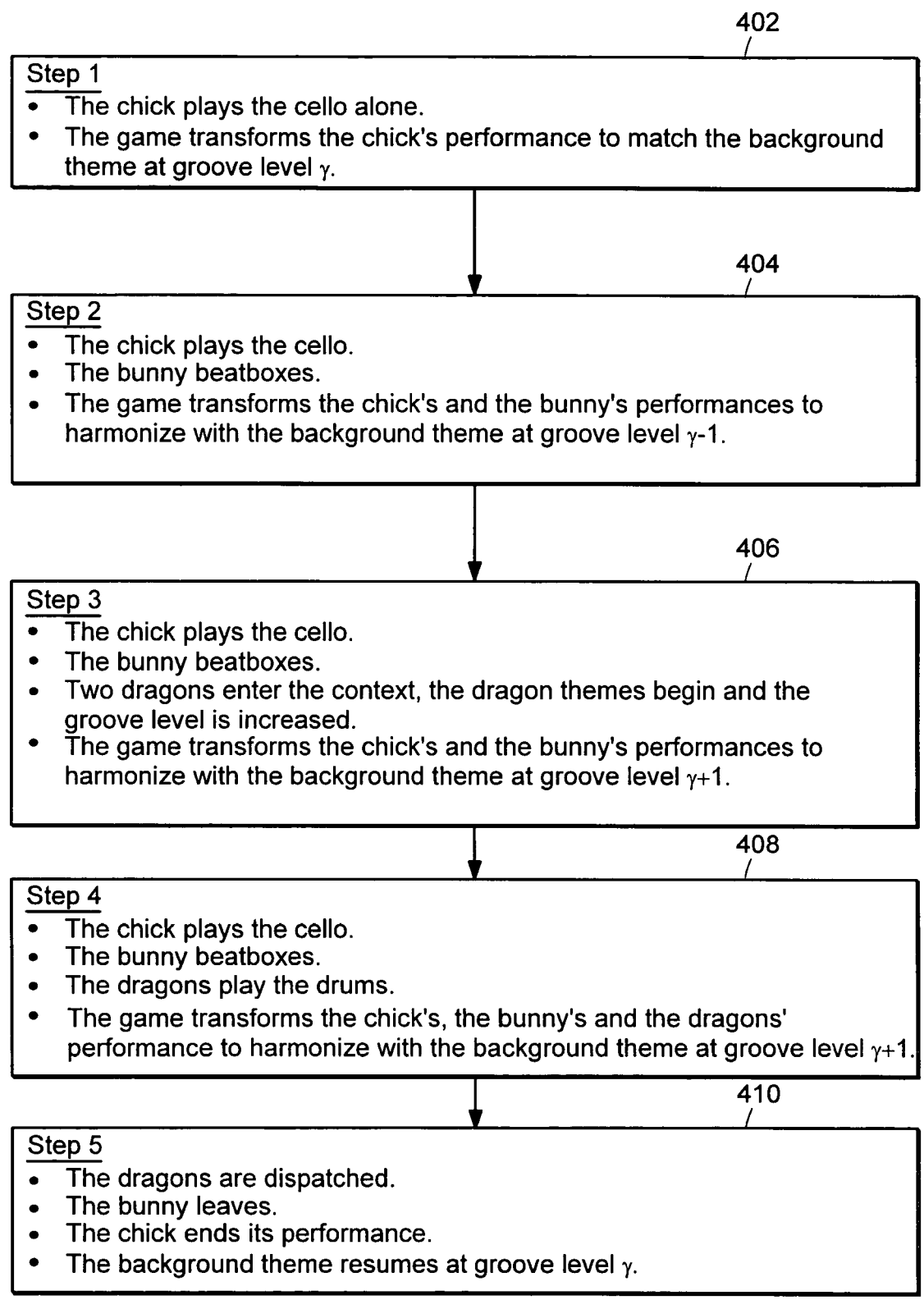
FIG. 4 is a flow chart which illustrates the synchronization of a player's performance with both the background theme and music of other characters.

FIG. 4 is a flow chart which illustrates the synchronization of a player's performance with both the background theme and music of other characters. In FIG. 4, five steps illustrate the game's operation through the preferred embodiment. These steps are as follows:

In the first step 402, the chick 204 is present within the context of the mountain range 208. As the chick 204 is alone, the groove level for the mountain range 208 is at its default value γ. Accordingly, the background theme for the mountain range 208 is playing. While there, the chick 204 obtains from its inventory a cello (not shown), and begins a new musical performance. The game software automatically transforms the chick's 204 music to harmonize with the background theme and match the chick's 204 rhythm to that of the background theme.

In the second step 404, the bunny 202 enters the mountain range 208 scene. The bunny's 202 appearance causes the groove level to decrease. Hearing the chick's 204 performance inspires the bunny to join in. However, as it has no instruments in its inventory, the bunny 202 must resort to beatboxing. The beatboxing bunny 202 begins its performance while the chick 204 continues playing its musical melody. The game software transforms both the chick's 204 music and the bunny's 202 beats to harmonize with the background theme and tempo at the revised groove level.

In the third step 406, two non-player dragons 206 (only one is illustrated) appear at the mountain range 208. Their appearance increases the tension within the mountain range context 208 and causes the groove level to increase. In addition, each dragon causes its own dragon theme to be played and, as necessary, transformed to harmonize with the background theme.

As part of its inventory, each dragon 206 carries a drumset. In the fourth step 408, the two dragons 206 begin their own drum performances. Thereafter, the game software transforms the music and beats of the two dragons 206, the chick 204 and the bunny 202 to harmonize with the background theme and tempo at the increased groove level.

In the fifth step 410, the two dragons 206 are dispatched. In addition, the bunny 202 leaves the mountain range 208. Accordingly, the groove level returns to its default level γ. The chick 204 ends its performance, and the sole remaining music is the background theme associated with the mountain region 208.

The present invention can be provided as one or more computer-readable programs embodied on or in one or more articles of manufacture. The article of manufacture can be a floppy disk, a hard disk, a CD ROM, a flash memory card, a PROM, a RAM, a ROM, or a magnetic tape. In general, the computer-readable programs can be implemented in any programming language. Some examples of languages that can be used include C, C++, or JAVA. The software programs can be stored on or in one or more articles of manufacture as object code.

In this fashion, embodiments of the present invention transform music played by characters, objects and non-player characters in mode, tempo and key in order to produce symphonic sounds within a massively multiplayer game. It will be appreciated by those skilled in the art that various omissions, additions and modifications can be made to the methods and systems described above without departing from the scope of the invention, and all such modifications and changes are intended to fall within the scope of the invention, as defined by the appended claims.

I claim:

1. A computer-implemented method for enhancing the experience of a first player controlling a first avatar in a computer game by causing a speaker to play a theme, the method comprising the steps of:
   (a) causing a processor to determine a context for the first avatar based on a first avatar's location in a virtual world;
   (b) causing a processor to select a groove level responsive to characteristics of the first avatar's virtual location, wherein the groove level is indicative of one of an excitement and a tension level;
   (c) causing a processor to play, at a non-zero output level, through a speaker, a background theme based on the first avatar's location and the selected groove level;
   (d) causing a processor to receive first instructions from the first player, the first instructions causing the first avatar to play a first melody, the first melody being chosen by the first player from among a plurality of available melodies;
   (e) causing a processor to receive second instructions from a second player, the second instructions causing a second avatar to play a second melody, the second melody being chosen by the second player; and
   (f) causing a processor to transform the first melody in response to the background theme and to the second melody by carrying out one of melody transposition and tempo matching.

2. The method of claim 1, wherein step (a) comprises selecting the context from the group consisting of grasslands, plains, desert, forest, dungeon, crypt, graveyard, castle, keep, bog, shire, mountains, valley, swamp, sea and hills.

3. The method of claim 1, wherein step (b) comprises changing the groove level from an initial groove level to a subsequent groove level in response to the total number of characters present in the first avatar's context.

4. The method of claim 3, wherein changing the groove level comprises subtracting a predetermined number from the initial groove level in response to the total number of avatar characters present in the first avatar's context.

5. The method of claim 1, wherein step (b) comprises changing the groove level from an initial groove level to a subsequent groove level in response to the total number of non-avatar characters present in the first avatar's context.

6. The method of claim 5, wherein changing the groove level comprises adding a predetermined number from a baseline groove level in response to the number of non-avatar characters present in the first avatar's context.

7. The method of claim 1, further comprising causing a processor to select a mode for background music in response to the first avatar's context and the groove level.

8. The method of claim 1, further comprising causing a processor to select a background theme four bars in length and having a chord change at every bar.

9. The method of claim 1, wherein step (b) comprises selecting a higher groove level when at least one type of non-avatar character is present in the first avatar's context.

10. The method of claim 1, wherein step (b) comprises selecting a lower groove level when at least one other avatar is present in the first avatar's context.

11. The method of claim 1, wherein the first melody corresponds to an instrument controlled by the first avatar.

12. The method of claim 1, wherein the first melody is selected according to the current background theme.

13. The method of claim 12, wherein the first melody comprises notes having a selected harmonic relationship with the current background theme.

14. The method of claim 1, wherein the second melody corresponds to an instrument controlled by the second avatar.

15. The method of claim 1, wherein the second melody is selected according to the current background theme.

16. The method of claim 1, wherein the second melody comprises notes having a selected harmonic relationship with the current background theme.

17. The method of claim 16, wherein the second melody comprises notes having a selected harmonic relationship with the first melody.

18. The method of claim 1, wherein a non-avatar character plays a non-avatar melody having a selected harmonic relationship with the current background theme.

19. The method of claim 18, wherein the non-avatar melody has a selected harmonic relationship with the first melody.

20. A system for enhancing the experience of a first player participating in a computer game, the system comprising:
   a context module
      for receiving, as input, coordinates specifying the location of a first avatar in a world, the first avatar being controlled by the first player, and
      for determining a context for the first avatar based on the coordinates;
   a groove module for selecting a groove level based on the number of other avatars present in the first avatar's context and the number of non-avatar characters present in the first avatar's context, wherein the groove level is indicative of one of an excitement and a tension level;
   a background theme database for storing a plurality of background themes; and
   a sound output module for selecting one of the plurality of background themes based on the first avatar's context and the groove level;
   wherein the system is configured to transform a first melody played by the first avatar in response to both the selected background theme a second melody played by a second avatar, wherein transformation of the first melody is carried out by one of melody transposition and tempo matching.

21. The system of claim 20, wherein the context module specifies a context from the group consisting of grasslands, plains, desert, forest, dungeon, crypt, graveyard, castle, keep, bog, shire, mountains, valley, swamp, sea and hills.

22. The system of claim 20, wherein the groove module changes the groove level for each other avatar present in the first avatar's context.

23. The system of claim 20, wherein the groove module changes the groove level for each non-avatar character present in the first avatar's context.

24. The system of claim 20, wherein the sound output module is configured to select a background theme written in Dorian mode when the groove level is within a first predetermined range.

25. The system of claim 20, wherein the sound output module is configured to select a background theme written in Phrygian mode when the groove level is within a second predetermined range.

26. The system of claim 20, wherein the sound output module is configured to select a background theme written in half-tone mode when the groove level is within a third predetermined range.

27. The system of claim 20, wherein the first melody corresponds to an instrument controlled by the first avatar.

28. The system of claim 20, wherein the first melody is selected according to the current background theme.

29. The system of claim 28, wherein the first melody comprises notes having a selected harmonic relationship with the current background theme.

30. The system of claim 20, wherein the second melody corresponds to an instrument controlled by the second avatar.

31. The system of claim 20, wherein the second melody is selected according to the current background theme.

32. The system of claim 31, wherein the second melody comprises notes transposed in response to the current background theme.

33. The system of claim 32, wherein the second melody comprises notes having a selected harmonic relationship with the first melody.

34. The system of claim 20, wherein a non-avatar character is allowed to play a non-avatar melody having a selected harmonic relationship with the current background theme.

35. The system of claim 34, wherein the non-avatar melody has a selected harmonic relationship with the first melody.

36. The system of claim 20, wherein the sound output module is configured to select a background theme written in a mode selected from the group consisting of Ionian mode, Lydian mode, Mixolydian mode, Aolian mode, and Locrian mode when the groove level is within a fourth predetermined range.

37. A computer-implemented method for allowing two or more players controlling corresponding avatars in a computer game to participate in a game's musical environment by causing a speaker to play a background theme, the method comprising:
   causing a processor to select a groove level responsive to characteristics of the avatars' virtual locations, wherein the groove level is indicative of one of an excitement and a tension level;
   causing a processor to play, at a non-zero output level, through a speaker, a background theme based on the avatars' location and the selected groove level;
   causing a processor to receive, from the players, instructions for causing their corresponding avatars to each selectively generate a sound; and
   causing a processor to cause the selectively generated sounds to transform in response to each other and in response to the background theme wherein the transformation is carried out by one of melody transposition and tempo matching.

38. The method of claim 37, wherein causing a processor to receive instructions comprises receiving instructions for playing a melody, and wherein causing the selectively generated sounds to transform comprises causing melodies associated with the selectively generated sounds to have a selected harmonic relationship.

39. A non-transitory computer-readable medium having encoded thereon software for enhancing the experience of a first player controlling a first avatar in a computer game, said software comprising instructions for:

(a) determining a context for the first avatar based on a first avatar's location in a virtual world;
(b) selecting a groove level responsive to characteristics of the first avatar's virtual location, wherein the groove level is indicative of one of an excitement and a tension level;
(c) playing, at a non-zero output level, a background theme based on the first avatar's location and the selected groove level;
(d) receiving first instructions from the first player, the first instructions causing the first avatar to play a first melody, the first melody being chosen by the first player from among a plurality of available melodies;
(e) receiving second instructions from a second player, the second instructions causing a second avatar to play a second melody, the second melody being chosen by the second player; and
(f) transforming the first melody in response to the background theme and to the second melody by carrying out one of melody transposition and tempo matching.

40. A non-transitory computer-readable medium having encoded thereon software for allowing two or more players controlling corresponding avatars in a computer game to participate in a game's musical environment, said software comprising instructions for:
selecting a groove level responsive to characteristics of the avatars' virtual locations, wherein the groove level is indicative of one of an excitement and a tension level;
playing, at a non-zero output level, a background theme based on the avatars' location and the selected groove level;
receiving, from the players, instructions for causing their corresponding avatars to each selectively generate a sound; and
causing the selectively generated sounds to transform in response to each other and in response to the background theme by carrying out one of melody transposition and tempo matching.

* * * * *